US007007667B2

(12) United States Patent
Borg et al.

(10) Patent No.: US 7,007,667 B2
(45) Date of Patent: Mar. 7, 2006

(54) COLD START FUEL CONTROL SYSTEM

(75) Inventors: Jonathan Borg, Livonia, MI (US); Shigeru Oho, Farmington Hills, MI (US); Frank Warren Hunt, West Bloomfield, MI (US); Ayumu Miyajima, Farmington Hills, MI (US)

(73) Assignee: Hitachi, Ltd., Tokyo (JP)

(*) Notice: Subject to any disclaimer, the term of this patent is extended or adjusted under 35 U.S.C. 154(b) by 197 days.

(21) Appl. No.: 10/624,228

(22) Filed: Jul. 22, 2003

(65) Prior Publication Data

US 2005/0016500 A1 Jan. 27, 2005

(51) Int. Cl.
*F02D 41/06* (2006.01)
*F02D 43/00* (2006.01)

(52) U.S. Cl. .................................. 123/406.47; 123/491

(58) Field of Classification Search ........... 123/179.12, 123/179.15, 179.16, 179.17, 179.21, 543, 123/557, 491, 406.47

See application file for complete search history.

(56) References Cited

U.S. PATENT DOCUMENTS 3,636,936 A * 1/1972 Schuette et al. ............ 123/598
3,974,815 A * 8/1976 Katsumata .................. 123/599
4,338,899 A * 7/1982 Geiger et al. .......... 123/399.11
5,197,430 A * 3/1993 Hoshiba et al. ........ 123/406.54
5,482,023 A 1/1996 Hunt et al. ................. 123/491
5,529,035 A * 6/1996 Hunt et al. ............ 123/179.15
5,890,467 A 4/1999 Romzek ..................... 123/299
5,893,349 A 4/1999 Rado ..................... 123/406.42
5,894,832 A 4/1999 Nogi et al. ................. 123/491
6,032,653 A 3/2000 Anamoto .................... 123/491
6,305,348 B1 10/2001 Grosmougin et al. ....... 123/299
6,389,806 B1 5/2002 Glugla et al. ............... 123/697
6,481,405 B1 11/2002 Fujino et al. ............ 123/179.3
6,526,939 B1 3/2003 Reitz et al. ................. 123/299
6,736,103 B1 * 5/2004 Hunt et al. ................. 123/299
2001/0011536 A1 8/2001 Nonomura et al. ......... 123/491
2002/0050265 A1 5/2002 Yoshida et al. ............. 123/295
2003/0075152 A1 4/2003 Joos et al. ............. 123/406.53

* cited by examiner

*Primary Examiner*—Henry C. Yuen
*Assistant Examiner*—Arnold Castro
(74) *Attorney, Agent, or Firm*—Gifford, Krass, Groh, Sprinkle, Anderson & Citkowski, P.C.

(57) ABSTRACT

An engine startup fuel control system for use with an internal combustion engine of the type having a plurality of combustion chambers, an air intake passage fluidly connected to each combustion chamber and a source of fuel. The system includes a multipoint fuel injector associated with each combustion chamber in which the multipoint fuel injector has an inlet connected to the fuel source and an outlet fluidly connected to the intake air passageway adjacent its associated combustion chamber. A cold start fuel injector also has an inlet connected to the fuel source and an outlet connected through a cold start passageway with each combustion chamber. A processing circuit selectively activates the multipoint fuel injectors as well as the cold start fuel injector. The processing circuit determines the air/fuel mixture introduced by the cold start fuel injector into each combustion chamber during engine startup and then selectively activates the multipoint fuel injectors to achieve a predetermined air/fuel mixture in each combustion chamber during engine startup. The processing circuit also variably retards the ignition of the combustion charge within at least one of the combustion chambers to achieve faster heating of a catalytic converter. Furthermore, the cold start fuel injector is optionally activated in a plurality of spaced subpulses for each combustion charge provided to each combustion chamber.

21 Claims, 4 Drawing Sheets

COLD START FUEL CONTROL SYSTEM

BACKGROUND OF THE INVENTION

I. Field of the Invention

The present invention relates generally to fuel control systems for internal combustion engines and, more particularly, to a fuel control system during a cold start engine condition.

II. Description of Related Art

Most modern day internal combustion engines of the type used in automotive vehicles include a plurality of internal combustion chambers. An intake manifold has one end open through a throttle to ambient air and its other end open to the internal combustion chambers via the engine intake valves. During a warm engine condition, a multipoint fuel injector is associated with each of the internal combustion chambers and provides fuel to its associated internal combustion chamber. The activation of each multipoint fuel injector is controlled by a processing circuit or electronic control unit (ECU).

During a cold start engine condition, however, a single cold start fuel injector is oftentimes used to provide the fuel charge to several or all of the combustion chambers for the engine. The cold start fuel injector injects sufficient fuel into a cold start fuel passageway open at its outlet to the air intake passageway to provide the fuel charge to the engine during engine warm up. As the engine warms up, the cold start fuel injector is gradually deactivated while, simultaneously, the multipoint fuel injectors are gradually activated in order to provide a smooth transition between the cold start fuel injector and the multipoint fuel injectors.

These previously known fuel control systems for the engines during engine startup, however, have suffered from a number of disadvantages. One such disadvantage is that it is necessary to provide an overly rich fuel mixture to the engine during a cold start engine condition in order to ensure proper engine starting. Many of the previously known systems which have a cold start fuel injector utilize electric heaters within the cold start fuel passageway to vaporize the fuel prior to its induction into the internal combustion engine. However, because it is necessary to provide a relatively large quantity of fuel in order to obtain the overly rich combustion charge to the engine combustion chambers to ensure smooth engine starting, in many cases, the fuel injected by the cold start fuel injector overly cools the electric heater. When this happens, unvaporized fuel is inducted into the engine combustion chambers during engine startup. Such unvaporized fuel disadvantageously increases noxious emissions from the engine in excess of those required by governmental emission regulations.

A still further disadvantage of these previously known fuel management systems during engine startup is that typically the cold start fuel injector is only activated once the engine attains a certain rotational speed, e.g. 70–100 rpm. When that rotational speed is obtained, the ECU begins activation of the cold start fuel injector. However, after this rotational speed is attained during engine cranking, the internal combustion engine must induct all of the air from the cold start fuel passageway before the actual air/fuel mixture from the cold start fuel injector actually reaches the internal combustion chambers of the engine and thus before actual fuel combustion can begin. This delay is known as the cold start fuel injector transport delay. In many cases, the delay can extend as long as eight combustion cycles for the engine.

A still further disadvantage associated with the cold start fuel injector transport delay is that, when the fuel charge from the cold start fuel passageway actually reaches the engine combustion chambers, only a partial air/fuel mixture is inducted into the engine combustion chamber during the first initial intake cycles for the engine. This partial fuel charge is typically insufficient to achieve engine combustion in the combustion chamber thus resulting in an uncombusted fuel charge in the engine exhaust. Such uncombusted fuel causes unacceptable engine emissions.

Many modern engines further include a catalytic converter connected to the exhaust stream from the engine. The catalytic converter eliminates, or at least greatly reduces, noxious engine emissions in the well known manner. However, it is necessary for the catalytic converter to achieve a predetermined operating temperature before the catalytic converter effectively operates to reduce and/or eliminate noxious emissions from the engine. With the previously known fuel control systems, the actual time delay from engine combustion until the time that the catalytic converter reaches its operating temperature is prolonged and oftentimes exceeds thirty seconds or more. Until the catalytic converter reaches its operating temperature, however, it will be ineffective to reduce noxious emissions from the engine.

It has been previously known to retard the spark ignition in order to achieve more rapid heating of the catalytic converter. However, such spark retardation for all of the engine cylinders results in poor and overly rough engine start.

SUMMARY OF THE PRESENT INVENTION

The present invention provides an engine fuel control system at engine startup which overcomes the above-mentioned disadvantages of the previously known systems.

In brief, the fuel control system for engine startup of the present invention is used with a conventional internal combustion engine having multiple internal combustion chambers. An air intake passageway has its inlet open to ambient air and its outlet open to the internal combustion chambers.

A multipoint fuel injector is associated with each combustion chamber and, when activated, injects fuel into its associated combustion chamber. The actual amount of fuel injected by the multipoint fuel injector is controlled by its duration of activation.

The internal combustion engine also includes at least one cold start fuel injector which injects a fuel charge into an inlet end of a cold start fuel passageway. The outlet end of the cold start fuel passageway is fluidly connected to at least several, and oftentimes all, of the internal combustion chambers. An electric heater is preferably mounted within the cold start fuel passageway to vaporize the fuel injected by the cold start fuel passageway prior to its induction into the internal combustion chambers.

A spark igniter, typically a spark plug, is also associated with each internal combustion engine. Activation of the spark igniter initiates combustion of the fuel charge within the internal combustion chamber. Following combustion, the resulting combustion products are expelled through the exhaust system of the engine, typically through a catalytic converter, and then into ambient air.

A processing circuit or electronic control unit (ECU) controls the timing and duration of activation of the multipoint fuel injectors, the cold start fuel injector, as well as the spark igniters. In its control of the multipoint fuel injectors and cold start fuel injectors, the ECU provides one or more pulses to the multipoint fuel injectors and/or cold start fuel injector which opens the cold start fuel injector or multipoint fuel injector for the duration of the pulse. Consequently, the duration of the pulse from the ECU to the multipoint fuel injectors and cold start fuel injector is directly proportional to the amount of fuel injected by the multipoint fuel injectors and cold start fuel injector, respectively.

The ECU also receives a number of input signals for various sensors in the engine. These sensors include, for example, the angular position of the main crankshaft from the engine from which both the rotational speed of the engine as well as the particular cycle of each of the combustion chambers of the four-cycle engine can be determined.

In operation, during an engine starting condition, the processing circuit monitors the engine speed. When the engine speed achieves a predetermined value, e.g. 70–100 rpm, the ECU initiates activation of the cold start fuel injector. Immediately following the activation of the cold start fuel injector, however, a fuel charge is not provided to any of the internal combustion engines by the cold start fuel injector since the pistons in the combustion chambers must first induct the air from the cold start fuel passageway due to the fuel charge transport delay in the cold start fuel passageway.

In order to obtain a fuel charge in the engine combustion chambers at the time of activation of the cold start fuel injector, the ECU simultaneously determines which of the multiple combustion chambers is in its intake cycle and the position of that particular combustion chamber(s) in its particular intake cycle. The ECU then activates the multipoint fuel injector for a duration sufficient to provide fuel to obtain a predetermined fuel charge within the combustion chamber in order to obtain engine ignition substantially simultaneously with activation of the cold start fuel injector.

During the succeeding intake cycles of the other internal combustion chambers, the ECU selectively determines the amount of fuel charge, if any, provided by the cold start fuel injector and then activates the multipoint fuel injector in an amount sufficient to obtain the predetermined air/fuel mixture in the combustion chamber when combined with the fuel charge from the cold start fuel injector. This process continues through as many intake cycles as required, typically corresponding to the number of cylinders within the engine, until the air within the cold start fuel passageway is completely purged or inducted by the engine pistons. When that occurs, the ECU deactivates the multipoint fuel injectors and relies primarily upon the cold start fuel injector to supply the fuel charge to the engine until engine warm up is achieved.

Additionally, the ECU variably retards the activation of the spark igniters for the engine combustion chambers so that the spark timing of at least one spark igniter is more retarded than the other spark igniters. By selective retardation of the spark, excess fuel is exhausted from the engine and combusted just prior to or within the catalytic converter thus decreasing the time required for the catalytic converter to achieve its operating temperature while maintaining smooth engine operation during cold start.

In still a further enhancement of the invention, rather than activate the cold start fuel injector with a single pulse for each fuel charge delivered to each cylinder, the ECU preferably divides the activating pulse for each fuel charge for each cylinder into a series of sub-pulses. In doing so, better vaporization of the fuel charge from the cold start fuel injector is achieved thereby achieving more efficient fuel combustion.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
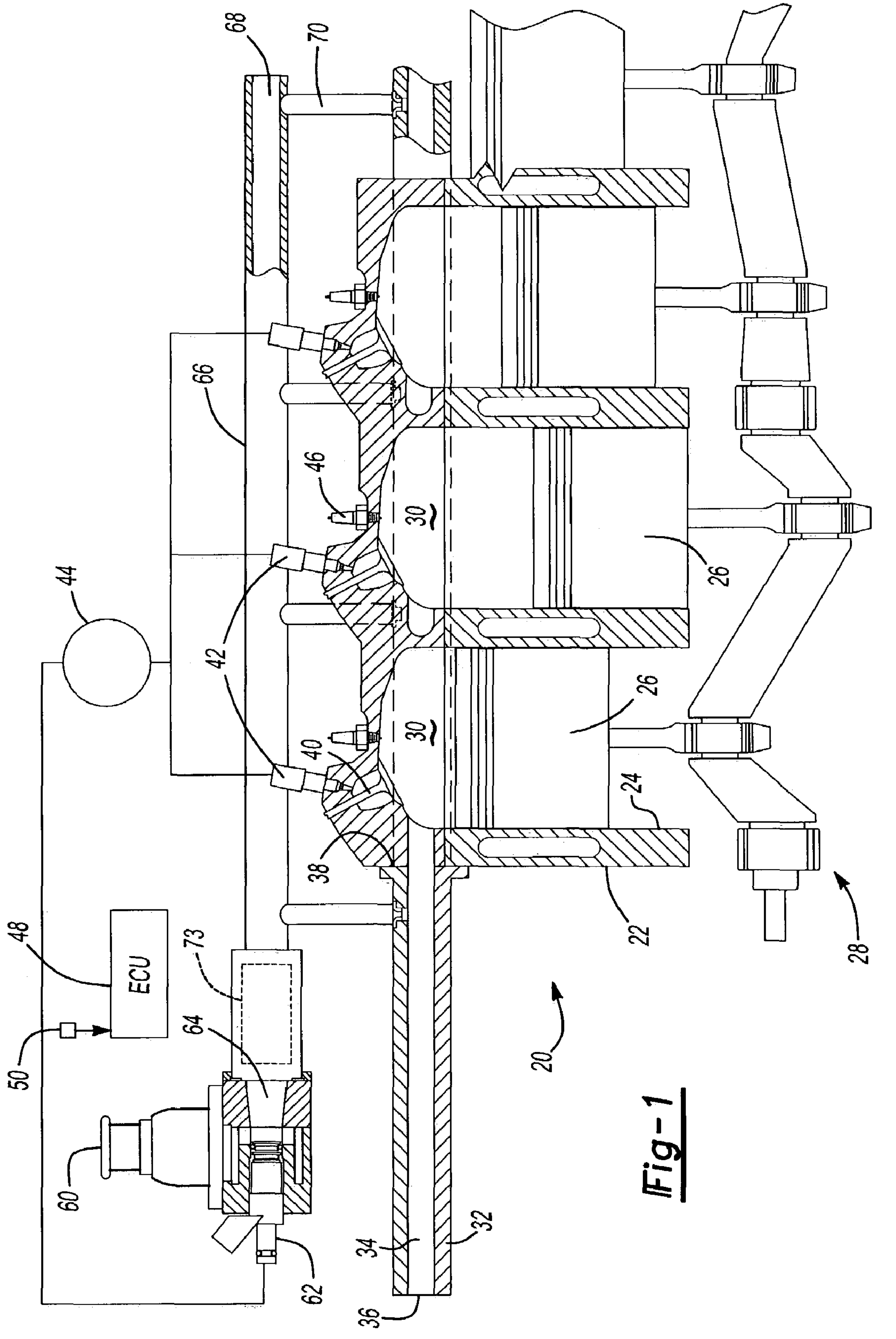
FIG. 1 is a block diagrammatic view illustrating a preferred embodiment of the present invention.

With reference first to FIG. 1, a portion of an internal combustion engine 20 is shown having an engine block 22 and a plurality of cylinders 24 formed within the engine block 22. A piston 26 is reciprocally slidably mounted within each cylinder 24 so that, upon reciprocation of the pistons 26 within their respective cylinders 24, rotatably drive a main crankshaft 28 in the conventional fashion.

A combustion chamber is formed between each piston 26 and its associated cylinder 24. An intake manifold 32 defining a main air intake passageway 34 has one end 36 open to ambient air while its other end 38 is fluidly connected to the combustion chambers 30 through a conventional intake valve 40 associated with each combustion chamber 30. Thus, upon reciprocation of the pistons 26 within their respective cylinders 24, the pistons 26 induct air through the main passageway 34 and into the combustion chamber 30 during the intake stroke of a four-cycle engine when the intake valve 40 is open.

A multipoint fuel injector 42 is associated with each combustion chamber 30. Each multipoint fuel injector 42 has an inlet fluidly connected to a source 44 of pressurized fuel (illustrated only diagrammatically) commonly known as a fuel rail. The output of each multipoint fuel injector 42 is open to its associated combustion chamber 30 so that, upon activation of the multipoint fuel injector 42, the multipoint fuel injector 42 injects fuel into the combustion chamber 30 of its associated cylinder 24. The amount of fuel injected by the multipoint fuel injector 42 during the intake strokes is proportional to the duration of activation of the multipoint fuel injector 42.

A spark igniter 46, such as a spark plug, is also associated with each combustion chamber 30 to ignite the combustible charge within the combustion chamber 30 during the power stroke of the engine 20.

An electronic control unit 48 is operatively connected to all of the multipoint fuel injectors 42 as well as the spark igniters 46 to control the activation of both the multipoint fuel injectors 42 and spark igniters 46. In practice, the ECU generates an activation pulse to the multipoint fuel injectors 42 at the appropriate time which opens the multipoint fuel injectors 42 so that the multipoint fuel injectors 42 inject the fuel from the source 44 into their associated combustion chamber 30 for the duration of the activation pulse. The duration of the activation pulse from the ECU 48 thus determines the amount of fuel injected by each of the multipoint fuel injectors 42. The ECU 48 also activates the spark igniters 46 at the appropriate time.

The ECU 48 receives an input signal from a sensor 50 indicative of the crank angular position of the main shaft 28 and cam position, hereinafter collectively called the crank angle position. Consequently, by processing the input from the sensor 48, the ECU is able to determine not only the rotational speed of the main shaft 28, but also the crank angular position of the main shaft 28. The angular position of the main shaft 28, in the conventional fashion, is indicative not only of the cycle of each of the pistons 26 in the cylinders 24, but also the position of each piston 26 within its particular stroke.

Still referring to FIG. 1, a cold start fuel injector 60 has its inlet 62 connected to the pressurized fuel source 44. The ECU 48 controls the activation of the cold start fuel injector 60 by issuing a series of pulses to the cold start fuel injector 60. The amount of fuel injected by the cold start fuel injector 60 is proportional to the duration of each pulse.

An outlet 64 of the cold start fuel injector 60 is fluidly connected through a cold start fuel passageway 68 formed by a cold start manifold 66 to the intake of multiple combustion chambers 30. Preferably, a single cold start fuel injector 60 provides fuel during a cold start engine condition to all of the combustion chambers 30. Alternatively, multiple cold start fuel injectors 60 may be employed with each cold start fuel injector handling different cylinders.

Still referring to FIG. 1, the cold start manifold 66 is preferably fluidly connected by an individual runner 70 for each combustion chamber 60 so that each runner 70 is open to the main intake manifold passageway 34 immediately upstream from the intake valve 40 of its associated combustion chamber 30. Furthermore, the volume of the cold start passageway 68 is preferably much less than the volume of the main intake manifold 34 for a reason to be subsequently described.

In order to facilitate vaporization of the fuel from the cold start fuel injector 60, an electrically powered heater 73 is provided adjacent the outlet 64 of the cold start fuel injector 60. Such heaters 73 are conventional in construction and vaporize the fuel from the cold start fuel injector 60 to provide a more efficient combustion charge to the combustion chambers 30 during a cold start operating condition.

Figure 2:
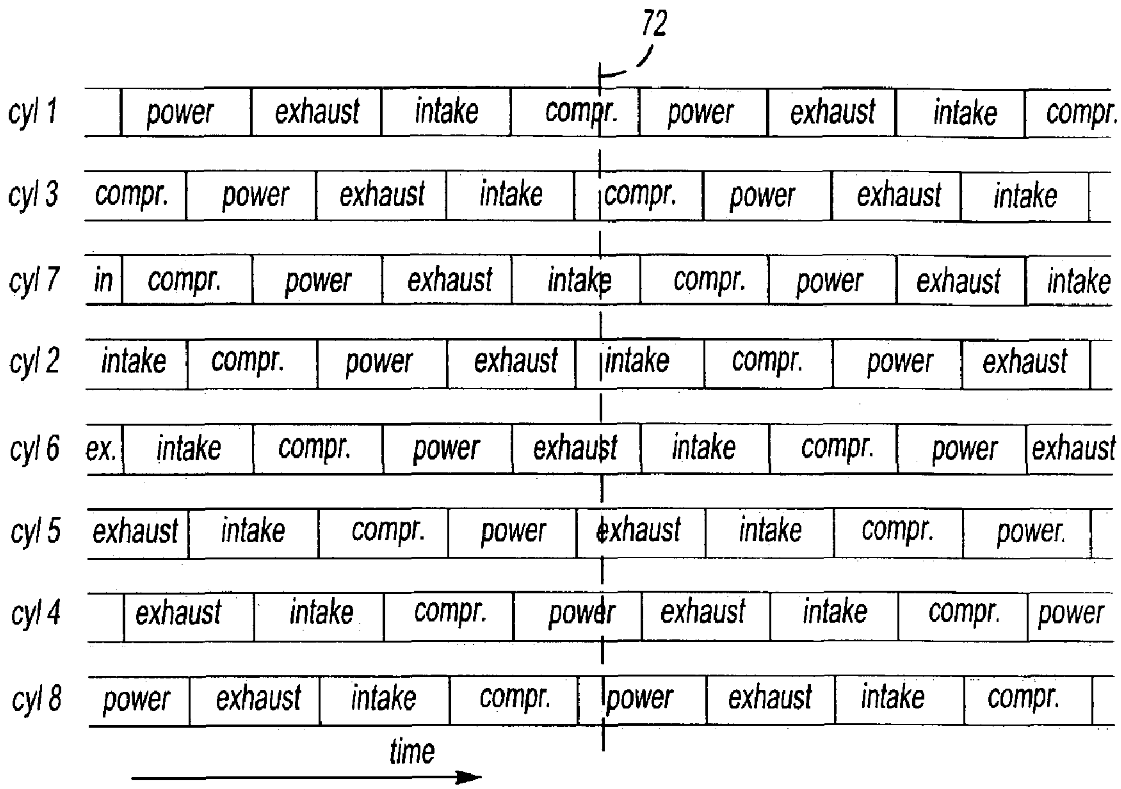
FIG. 2 is a cylinder event chart for an eight-cylinder engine.

With reference now to FIG. 2, an exemplary cylinder event chart for an eight-cylinder four-cycle engine is shown in which each engine cycle for each cylinder consists of the intake, compression, power and exhaust strokes. Each complete engine cycle, i.e. intake through exhaust cycle, requires two revolutions of the main shaft 28 (FIG. 1) in the conventional fashion.

During engine startup, the ECU 48 monitors the rotary speed of the main shaft 28 and initiates the activation of the cold start fuel injector 60 only after the rotary speed of the shaft 28 achieves a predetermined value, e.g. 70–100 rpm. For exemplary purposes, the initiation of the cold start fuel injector 60 is indicated at time 72 in FIG. 2.

With reference particularly to FIG. 2, at time 72, cylinder 7 is approximately 65% through its intake cycle while cylinder 2 is approximately 17% into its intake stroke. All other cylinders of the engine 20 are in different strokes of the engine cycle.

Figure 3:
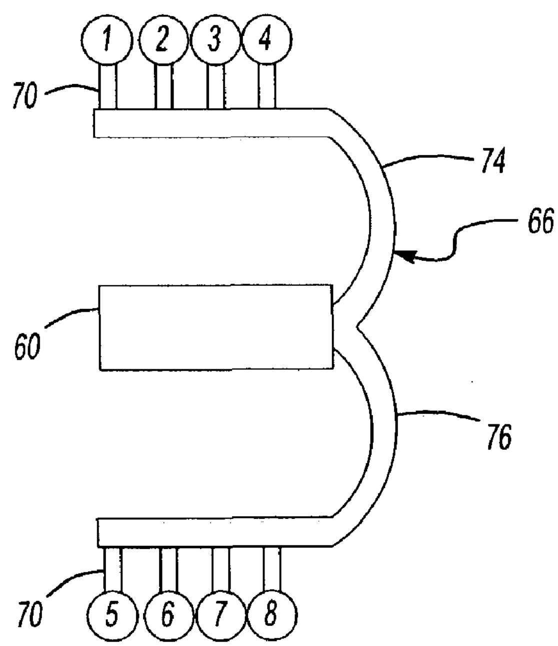
FIG. 3 is a diagrammatic view illustrating the cold start fuel injection system for an eight-cylinder engine.

With reference now to FIG. 3, a schematic layout of the eight-cylinder engine 20 of the invention is shown in which the cold start manifold 66 is divided into two submanifolds 74 and 76. The submanifold 74 is fluidly connected to cylinders 1–4 through the runners 70 while the submanifold 76 is fluidly connected to the cylinders 5–8 through their respective runners 70. Thus, at time 72 (FIG. 2), i.e. at the initial activation of the cold start fuel injector 60, cylinder 7 inducts air from the submanifold 76 while, conversely, cylinder 2 inducts air from the submanifold 74 simultaneously with the initial injection of fuel by the cold start fuel injector 60 into the manifold 66.

During the initial activation of the cold start fuel injector 60 at time 72, the air/fuel charge from the cold start fuel injector 60 has not yet reached either cylinder 2 or cylinder 7 (for the example shown) due to the transport delay of the air/fuel charge from the cold start fuel injector 60 through the submanifolds 74 and 76. In order to compensate for this transport delay from the cold start fuel injector 60 and to provide a predetermined air/fuel mixture to the engine combustion chambers 30 immediately upon activation of the cold start fuel injectors 60, i.e. at time 72 (FIG. 2), the ECU 48 simultaneously activates the multipoint fuel injectors 42 for cylinders 7 and 2 for a time sufficient to inject the desired predetermined air/fuel mixture into its associated combustion chamber.

Figure 4:
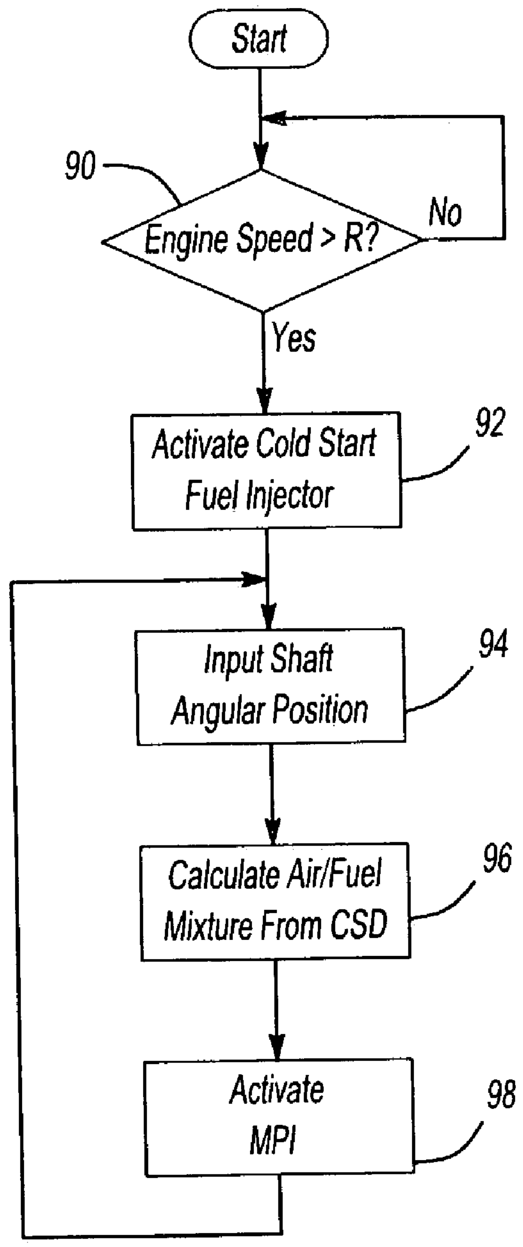
FIG. 4 is a flowchart illustrating a preferred embodiment of the present invention.

With reference now to FIG. 4, a flowchart illustrating the operation of the present invention is shown. At step 90, the ECU monitors the engine rotary speed of the main shaft 28 to determine if the engine speed has achieved a predetermined value R. If not, step 90 continues to iterate until the predetermined engine speed R is achieved. Once the predetermined engine speed R has been achieved, step 90 branches to step 92.

At step 92 the ECU 48 activates the cold start fuel injector 60 and then proceeds to step 94. At step 94, the ECU inputs the angular position of the main shaft 28 to determine not only which of the engine cylinders are in the intake stroke of the engine four-stroke cycle, but also the relative position of the engine cylinders within their respective intake stroke. Step 94 then branches to step 96.

At step 96, the ECU 48 calculates the amount of the air/fuel mixture reaching the particular cylinder under the intake stroke by subtracting the total volume of the air within the cold start submanifolds 74 and 76 and associated runners 70 from the amount of air inducted by the engine from time 72. It is only after all of the air has been inducted by the engine from the submanifolds 74 and 72 and runners 70 that the fuel charge from the cold start fuel injector 70 actually reaches the combustion chambers 30 of the engine 20. Step 96 then branches to step 98.

At step 98, the ECU 48 activates the multipoint fuel injector 42 associated with the combustion chambers 30 during the intake stroke to provide a predetermined air/fuel mixture, when combined with the air/fuel mixture from the cold start fuel injector 60, immediately following activation of the cold start fuel injector 60 at time 72. Step 98 then branches back to step 94 and iteratively calculates the necessary activation of the multipoint fuel injector 42 until all of the air in the cold start submanifolds 72 and 74 has been purged, i.e. inducted by the engine. At that time, the ECU deactivates the multipoint fuel injector and the cold start fuel injector 60 solely provides the fuel to the engine combustion chambers 30 until the conclusion of the engine warm up period.

For example, assuming that the engine is a 4.6-liter eight-cylinder that is activated during time 72 (FIG. 2), the volume inducted by each cylinder is equal to:

$$\frac{4.6\text{ L}}{8} = 0.575\text{ L/cylinder}$$

Assume further that each cold start submanifold 74 has a total volume of 0.5 liters per submanifold 74 or 76 and that each runner 70 has a total volume of 0.14 liters. Furthermore, as previously described, at time 72, the cylinder 7 has approximately 35% left of its intake stroke while cylinder 2 has approximately 83% left of its intake stroke. As such, the amount of air inducted by cylinder 7 from its submanifold 76 following time 72 is calculated as follows:

$$0.35\times0.575\text{ L}=0.2\text{ L}$$

Of the 0.2 liters inducted by cylinder 7 following time 72, 0.14 liter is inducted from the runner 70 associated with cylinder 7 so that 0.06 liters of residual air is inducted from the submanifold 76.

Similarly, since cylinder 2 has approximately 83% left of its intake stroke following time 72, the amount of air inducted by cylinder 2 following time 72 is calculated as follows:

$$0.83\times0.575\text{ L}=0.48\text{ L}$$

Of the 0.48 liters inducted by cylinder 2 following time 72, 0.14 liter is inducted from the runner 70 associated with cylinder 2 while the remaining 0.34 liter is inducted from the submanifold 74.

Initially following time 72, absolutely no fuel from the cold start fuel injector 60 reaches the engine combustion chambers 30 for cylinders 7 and 2 through the intake cycle of cylinder 6 (see FIG. 2). Consequently, the ECU activates the multipoint fuel injectors 42 to provide the fuel, when combined with the fuel charge from the cold start fuel injector, if any, necessary to achieve the desired air/fuel ratio in the cylinders. Thereafter, the fuel charge from the cold start fuel injector 60 begins to reach the engine combustion chambers 30. When this occurs, the amount of fuel supplied by the multipoint fuel injectors is diminished so that, when combined with the fuel charge provided by the cold start fuel injector, the predetermined air/fuel mixture for the combustion chamber is achieved. In practice, one full intake cycle of each cylinder is necessary in order to not only purge all of the air from the submanifolds 72 and 74, but also from all of the runners 70 associated with the combustion chambers 30. A table depicting the fuel provided by the multipoint fuel injectors and cold start fuel injector 60 is summarized for the example shown in the table below:

| | Charge | Residual Air Inducted | | | | | | | |
|---|---|---|---|---|---|---|---|---|---|
| | Volume (since CSD | From | From Manifold | From Manifold | Air/Fuel | Approx. Charge Composition | | Remaining Residual Air in Fuel Manifold | |
| Cyl. | starts) ltr | Runner ltr | 74 ltr | 76 ltr | Inducted ltr | Air Only (%) | Air/Fuel (%) | Manifold 74 init: 0.5 ltr | Manifold 76 init: 0.5 ltr |
| 7 | 0.20 | 0.14 | | 0.06 | 0 | 100 | 0 | | 0.44 |
| 2 | 0.48 | 0.14 | 0.34 | | 0 | 100 | 0 | 0.16 | |
| 6 | 0.575 | 0.14 | | 0.435 | 0 | 100 | 0 | | 0.005 |
| 5 | 0.575 | 0.14 | | 0.005 | 0.43 | 25 | 75 | | 0 |
| 4 | 0.575 | 0.14 | 0.16 | | 0.275 | 52 | 48 | 0 | |
| 8 | 0.575 | 0.14 | | | 0.435 | 24 | 76 | | |
| 1 | 0.575 | 0.14 | | | 0.435 | 24 | 76 | | |
| 3 | 0.575 | 0.14 | | | 0.435 | 24 | 76 | | |

-continued

| Cyl. | Charge Volume (since CSD starts) ltr | Residual Air Inducted From Runner ltr | Residual Air Inducted From Manifold 74 ltr | Residual Air Inducted From Manifold 76 ltr | Air/Fuel Inducted ltr | Approx. Charge Composition Air Only (%) | Approx. Charge Composition Air/Fuel (%) | Remaining Residual Air in Fuel Manifold: Manifold 74 init: 0.5 ltr | Remaining Residual Air in Fuel Manifold: Manifold 76 init: 0.5 ltr |
|---|---|---|---|---|---|---|---|---|---|
| 7 | 0.575 | | | | 0.575 | 0 | 100 | | |
| 2 | 0.575 | | | | 0.575 | 0 | 100 | | |

By providing additional fuel from the multipoint fuel injectors following time 72, the present invention ensures that sufficient fuel is provided to the engine combustion chambers 30 to enable engine combustion. This, in turn, leads to better emission levels from the engine since, unlike the previously known engines, the likelihood of uncombusted fuel exhausted from the engine is eliminated or at least minimized. It will be understood, of course, that the calculated fuel values may be empirically modified to compensate for actual engine conditions.

Since a relatively large amount of fuel must be provided to the engine to ensure quick engine startup, during a conventional activation of the cold start fuel injector, the cold start fuel injector has previously been activated by the ECU 48 for a single pulse per intake stroke per cylinder to provide the fuel charge to that cylinder. This oftentimes overloads the heater in the cold start fuel system and cools the heater below operating temperature. When this occurs, less than complete fuel vaporization can undesirably result.

Figure 5:
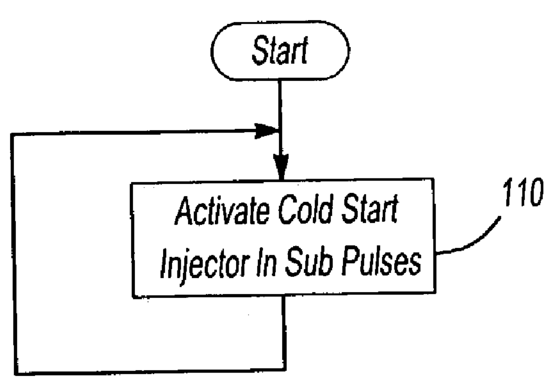
FIG. 5 is a flowchart illustrating a still further modification of the present invention.

With reference now to FIG. 5, as a further strategy to minimize the likelihood of unvaporized fuel reaching the engine, at step 110 the ECU, rather than activating the cold start fuel injector 60 for a single pulse for each intake stroke of each combustion chamber 30, the ECU at step 110 activates the cold start fuel injector in a plurality of subpulses thus minimizing the possibility of overloading the heater 73.

Figure 6:
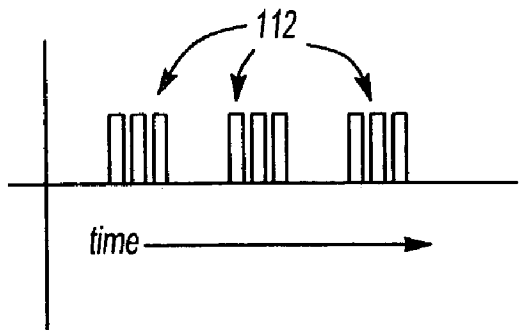
FIG. 6 is a chart illustrating the operation of the flowchart of FIG. 5.

With reference now to FIG. 6, the activation of the cold start fuel injector 60 in a plurality of subpulses is there shown diagrammatically. It will be understood, of course, that each group of subpulses 112 provides the fuel charge for a single engine combustion chamber. Preferably, each group of subpulses includes at least two and preferably three or more subpulses 112.

By substituting a plurality of subpulses of fuel injection from the cold start fuel injector for the previously known single pulse, each fuel subpulse results in lower thermal cooling of the heater 73 than would occur with the previously known single fuel pulse. Furthermore, the spacing between the fuel subpulses enables the heater 73 to recover somewhat in the time space between adjacent subpulses so the heater 73 remains substantially at operating temperature and ensures complete vaporization of the fuel.

Figure 7:
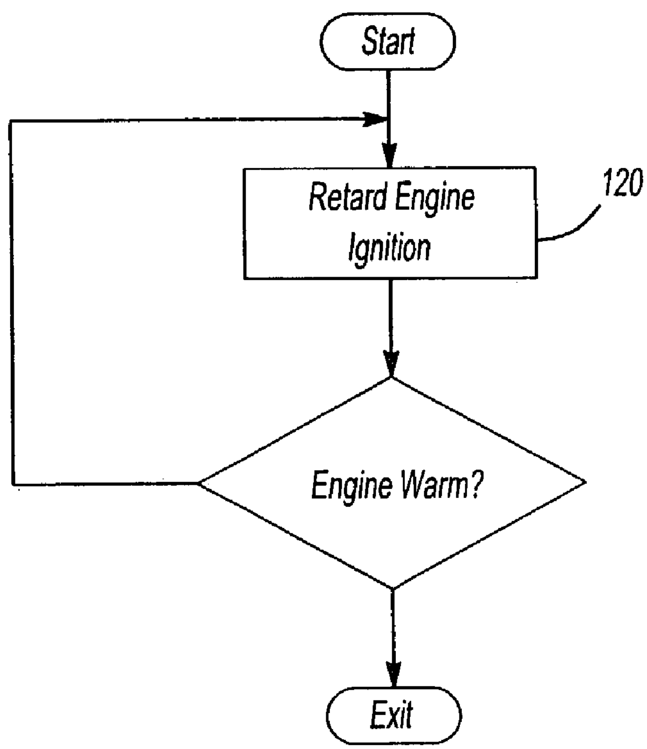
FIG. 7 is a flowchart illustrating a further modification of the present invention.

With reference now to FIG. 7, a still further strategy to minimize noxious emissions during engine startup is illustrated. At step 120 the ECU variably retards at least one, but less than all, of the spark igniters 46 so that the ignition timing of at least one spark igniter differs from the other spark igniters. By retarding the spark ignition of a limited number of engine cylinders by 1–10° relative to the remaining cylinders, the still combusting fuel charge is exhausted into the exhaust stream from the engine and to the catalytic converter. In doing so, the catalytic converter achieves its operating temperature more rapidly but without the adverse side effects that would occur if the spark ignition were retarded for all of the engine cylinders.

In order to enhance engine stability during engine startup with variable spark retard for the engine cylinders, preferably matching pairs of cylinders, i.e. transversely aligned cylinders on opposite banks of a two-bank engine, are variably retarded by the same amount. Additionally, preferably the spark ignition for the engine cylinders having the shortest distance between their exhaust port and the catalytic converter are additionally retarded relative to the other cylinders to enhance the rapid heating of the catalytic converter.

In practice variable spark retard should be terminated once the catalytic converter reaches its operating temperature. In addition, variable spark retard should be terminated once the transmission is engaged or put into gear since the engine performance during variable spark retard may be insufficient to adequately handle the additional performance demands once the transmission is engaged.

From the foregoing, it can be seen that the present invention provides a number of fuel strategies at engine startup for minimizing noxious emissions from the engine as well as providing a fast engine start and fast engine warm up. Having described our invention, however, many modifications thereto will become apparent to those skilled in the art to which it pertains without deviation from the spirit of the invention as defined by the scope of the appended claims.

We claim:

1. An engine startup fuel control system for use with an internal combustion engine of the type having a plurality of combustion chambers, an intake air passage fluidly connected each combustion chamber and a source of fuel, said fuel control system comprising:

a multipoint fuel injector associated with each combustion chamber, each multipoint fuel injector having an inlet connected to said fuel source and an outlet fluidly connected to said intake air passageway adjacent its associated combustion chamber, a cold start fuel injector having an inlet connected to said fuel source and an outlet fluidly connected through a cold start passageway with each combustion chamber, processing means for selectively activating each of said multipoint fuel injectors and said cold start fuel injector, said processing means having means for determining the air/fuel mixture introduced by said cold start fuel injector into at least one combustion chamber during engine startup, said processing means having means responsive to said determining means for selectively activating each said multipoint fuel injector to achieve a predetermined air/fuel mixture in each combustion chamber during engine startup.

2. The invention as defined in claim 1 wherein said determining means determines the air/fuel mixture introduced by said cold start fuel injector into each combustion chamber during startup.

3. The invention as defined in claim 1 wherein the engine includes a main drive shaft and comprising:

a position sensor which provides an output signal representative of the angular position of the main shaft, said output signal from said position sensor being connected as an input signal to said processing means, said processing means comprises means responsive to said output signal from said position sensor for determining the rotary speed of the main shaft, wherein said processing means begins activation of said multipoint fuel injectors and said cold start fuel injector at a predetermined rotary speed of the main shaft during engine startup.

4. The invention as defined in claim 1 and comprising a spark ignition system having a spark igniter associated with each combustion chamber, and means for retarding activation of the spark igniter for at least one combustion chamber during engine startup.

5. The invention as defined in claim 4 wherein said retarding means comprises means for retarding an ignition timing of at least one of the spark igniters during engine startup so that the ignition timing of said at least one spark igniter is different than the other spark igniters.

6. The invention as defined in claim 1 wherein said processing means activates said cold start fuel injector for at least two spaced pulses per combustion charge per cylinder.

7. The invention as defined in claim 1 wherein said processing means activates said cold start fuel injector for at least three spaced pulses per combustion charge per cylinder.

8. An engine startup fuel control system for use with an internal combustion engine of the type having a plurality of combustion chambers, an intake air passage fluidly connected each combustion chamber, a cold start fuel passageway having an inlet and an outlet, the cold start fuel passageway outlet being fluidly connected to the combustion chambers and a source of fuel, said fuel control system comprising:

a multipoint fuel injector associated with each combustion chamber, each multipoint fuel injector having an inlet connected to the fuel source and an outlet fluidly connected to said intake air passageway adjacent its associated combustion chamber, each said multipoint fuel injector, upon activation, injecting fuel into its associated combustion chamber, a cold start fuel injector having an inlet connected to said fuel source and an outlet fluidly connected to the inlet of the cold start fuel passageway, said cold start fuel injector, upon activation, introducing a fuel charge into the inlet of the cold start fuel passageway, processing means for producing a predetermined combustible charge in each combustion chamber during engine startup by selectively activating said multipoint fuel injectors during engine startup to provide fuel to each combustion chamber sufficient to compensate for any transport delay of the fuel charge from the cold start fuel injector through the cold start fuel passageway.

9. The invention as defined in claim 8 wherein the engine includes a main shaft and wherein said processing means initiates activation of said cold start fuel injector and said multipoint fuel injectors at a predetermined rotational speed of said main shaft.

10. The invention as defined in claim 8 and comprising a spark ignition system having a spark igniter associated with each combustion chamber, and means for retarding activation of the spark igniter for at least one combustion chamber during engine startup.

11. The invention as defined in claim 10 wherein said retarding means comprises means for retarding an ignition timing of at least one of the spark igniters during engine startup so that the ignition timing of said at least one spark igniter is different than the other spark igniters.

12. The invention as defined in claim 8 wherein said processing means activates said cold start fuel injector for at least two spaced pulses per combustion charge per cylinder.

13. The invention as defined in claim 8 wherein said processing means activates said cold start fuel injector for at least three spaced pulses per combustion charge per cylinder.

14. A method for managing fuel delivery in an internal combustion engine having multiple combustion chambers during engine startup, said engine having a main shaft and a multipoint fuel injection associated with each combustion chamber and a cold start fuel injector which, upon activation, provides a fuel charge to at least a plurality of combustion chambers through a cold start fuel passageway, said method comprising the steps of:

determining the rotational speed and angular position of the main shaft, activating the cold start fuel injector when the main shaft reaches a predetermined rotational speed, calculating the air/fuel charge provided to each combustion chamber by the cold start fuel injector as a function of the angular position of the main shaft and time of activation of the cold start fuel injector, and selectively activating at least one multipoint fuel injectors in response to said calculating step to achieve a predetermined combined fuel charge from said cold start fuel injector and said multipoint fuel injectors in each combustion chamber.

15. The invention as defined in claim 14 and comprising the step of retarding combustion in at least one combustion chamber during engine startup.

16. The invention as defined in claim 15 wherein said retarding step further comprises the step of retarding combustion in at least one combustion chamber in an amount different than the other combustion chambers.

17. The invention as defined in claim 14 wherein said activating step comprises the step of activating the cold start fuel injector in a plurality of pulses for the fuel charge provided to each combustion chamber by the cold start fuel injector.

18. The method of claim 14 wherein said activating step further comprises the step of selectively activating each said multipoint fuel injectors in response to said calculating step to achieve a predetermined combined fuel charge from said cold start fuel injector and said multipoint fuel injectors in each combustion chamber.

19. An engine startup fuel control system for use with an internal combustion engine of the type having a plurality of combustion chambers, an intake air passage fluidly connected each combustion chamber, a spark igniter associated with each combustion chamber and a source of fuel, said fuel control system comprising:

means for providing fuel to the combustion chambers during engine startup, means for selectively activating the spark igniters associated with combustion chambers to initiate fuel combustion in the combustion chambers, means for selectively retarding activation of at least one of the spark igniters during engine startup in an amount different than the other spark igniters.

20. The invention as defined in claim 19 wherein the internal combustion engine includes two banks of cylinders and wherein said selective retarding means selectively retards two aligned cylinders in opposite banks of the engine.

21. An engine startup fuel control system for use with an internal combustion engine of the type having a plurality of combustion chambers, an intake air passage fluidly connected each combustion chamber, a cold start fuel passageway having an inlet and an outlet, the cold start fuel passageway outlet being fluidly connected to the combustion chambers and a source of fuel, said fuel control system comprising:

a multipoint fuel injector associated with each combustion chamber, a cold start fuel injector having an inlet connected to said fuel source and an outlet fluidly connected to the inlet of the cold start fuel passageway, said cold start fuel injector, upon activation, introducing a fuel charge into the inlet of the cold start fuel passageway, means for activating said cold start fuel injector in a plurality of pulses to produce the fuel charge for each combustion cycle of each combustion chamber.

* * * * *